Aug. 17, 1971 W. H. BERGMANN 3,600,281

MICROSTABILIZED SUPERCONDUCTOR

Filed June 18, 1969

Inventor
Wilfried H. Bergmann
Roland A. Anderson
Attorney

United States Patent Office 3,600,281
Patented Aug. 17, 1971

3,600,281

MICROSTABILIZED SUPERCONDUCTOR

Wilfried H. Bergmann, Naperville, Ill., assignor to the United States of America as represented by the United States Atomic Energy Commission Filed June 18, 1969, Ser. No. 834,427
Int. Cl. H01f 7/22
U.S. Cl. 335—216 5 Claims

ABSTRACT OF THE DISCLOSURE

A microstabilized superconductor comprises a superconducting material of the hard Type II series sized in cross sectional area less than 1000 times the coherence length of the material.

The invention described herein was made in the course of, or under, a contract with the United States Atomic Energy Commission.

BACKGROUND OF THE INVENTION

This invention relates to superconductors and more particularly to microstabilized superconductors.

Superconducting magnets and coils are becoming more important as the requirement for larger electromagnets and fields increases. One problem associated with superconducting magnets is the ability of the superconductors forming the magnet to remain in a superconducting state, that is, to remain stable. Present magnets embody cables or composite conductors wherein a plurality of superconductors, such as niobium-tin, are embedded in an electrically conductive material which is normal at superconducting temperatures. In this construction, the cross section of the material is greater than the cross section of the superconductors and its acts as an electrical and thermal shunt to inhibit normal region propagation in the magnet.

It is an object of the present invention to provide a microstabilized superconductor.

It is another object of the present invention to provide an improved superconductor relative to its ability to inhibit normal region propagation therein.

It is another object of the present invention to provide a superconducting magnet embodying a superconductor having low normal region propagation characteristics.

Other objects of the present invention will become apparent as the detailed description proceeds.

SUMMARY OF THE INVENTION

In general, the present invention is characterized by a microstabilized superconductor comprising a superconducting material of the hard Type II series sized in cross section less than 1000 times the coherence length of the material.

BRIEF DESCRIPTION OF THE DRAWINGS

Further understanding of the present invention may best be obtained from consideration of the accompanying drawings wherein.

Figure 1:
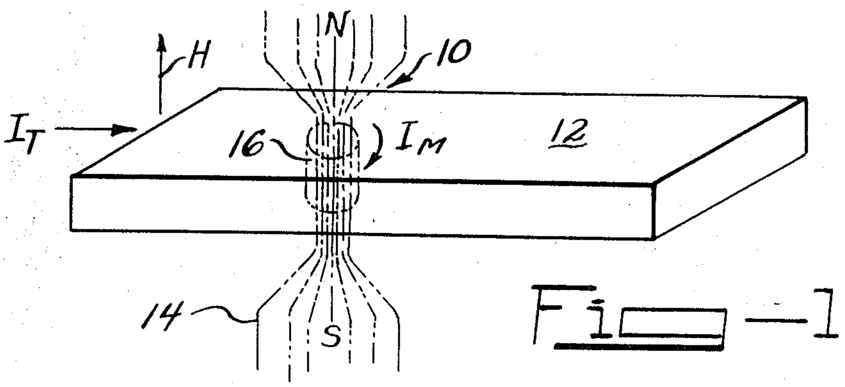
FIG. 1 is a drawing showing the propagation of a fluxoid within a superconductor.

To further understanding of the present invention, reference is made to FIG. 1 wherein is shown a fluxoid 10 present in a superconductor 12. The superconductor 12 is of a material of the hard Type II series, that is, a material which comprises superconducting alloys or intermetallic compounds or interstitial compounds. Below the lower critical field ($H_{C1}$) the hard Type II series superconductor excludes all magnetic fields. Above $H_{C1}$ the magnetic fields penetrate the superconductor 12 and, where such penetration occurs, normal regions exist within the superconductor. As stated, a magnetic field 14 is shown for explanatory purposes penetrating the superconductor 12. The region 16 of the superconductor 12 through which the field 14 passes is, as hereinbefore stated, a normal region within the superconductor, that is, the material in this region is no longer in a superconducting state. Supercurrents (magnetization current $I_M$) flow around the region 16 within the superconductor 12, as shown. The transport current ($I_T$) flows through the superconductor 12 and around the region 16 formed by the passage of the flux of field 14 through the superconductor 12. As the external field H or the transport current $I_T$ changes, the fluxoids 10 in the superconductor 12 move across the superconductor in a direction related to the Lorentz force created thereby. The motion of the fluxoids 10 within the superconductor 12 generates a voltage which, with the transport current $I_T$, creates heat, which heat can cause normal region propagation in the superconductor 12 with possible destruction thereof.

In the practice of the present invention, the superconductor 12 is sized so that its cross sectional area is less than 1000 times the coherence length of the material forming the superconductor. The coherence length of the material is a function of the mean free path of the conduction electrons in the material and it has been found that microstabilization of the material may be effected so that normal propagation in the material is inhibited by maintaining this size relationship. In the practice of the present invention, the cross sectional area of the superconductor 12 is inversely related to the charge rate of the superconductors and for D-C operating modes where the charge rates are relatively slow the cross sectional area of the superconductor may approach 1000 times the coherence length of the material of the superconductor. For cyclic or fast charging-rate modes of operation as is found in the superconducting magnets of particle accelerators of the Alternating-Gradient Synchrotron design, the cross sectional area has to be decreased and approaches 100 times the coherence length of the material of the superconductor. With a cross section sized as described and superfluid helium disposed thereabout, heat generated by motion of the fluxoids 10 in the superconductor 12 is removed from the superconductor 12 so that normal region propagation therein not effected.

Figure 2:
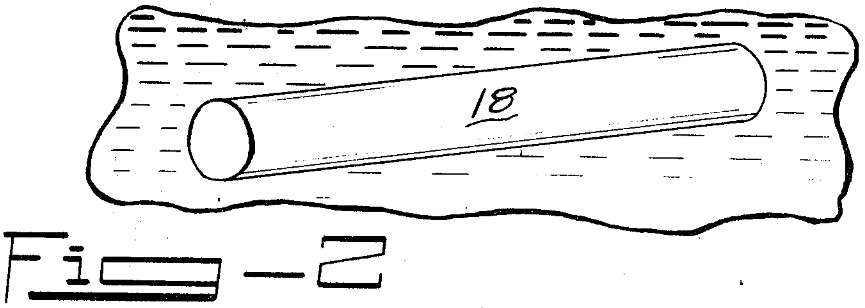
FIG. 2 is a drawing of a superconductor constructed according to the present invention.

Further appreciation of the present invention may be obtained by considering the superconductor illustrated in FIG. 2. The superconductor 18 in FIG. 2 is constructed to effect the practice of the present invention. It comprises a sintered material, the particles of which sinter are each sized less than 1000 times the coherence length of the material forming the sinter. For example, using a typical hard Type II series material, such as niobium-tin having a coherence length of approximately 250 A., the sinter is formed from niobium powder and tin powder, which powders have particles sized therein approximately 1 micron. These powders are mixed and the mixture sintered by heating in an inert atmosphere, such as helium, at a temperature of 975° C. to 1050° C. to form the sintered superconductor 18 illustrated in FIG. 2. With the sintered superondcuctor 18 immersed in superfluid helium, normal region propagation within the superconductor is inhibited. It will be appreciated that superfluid helium, which is liquid helium in its superfluid phase, provides a unique heat transport mechanism which is capable of creating heat flows of several watts per $cm.^2$ over temperature gradients of a few millidegrees with very small, if any, losses. Using the aforedescribed construction, the short sample characteristics of a 10-micron diameter sintered superconductor, formed from niobium-tin powder whose particles were 1 micron in diameter or less, were such that the superconductor sustained a transport current of about 500,000 $amps/cm.^2$ in a field of 100 kilogauss which was achieved in approximately 1 second.

Figure 3:
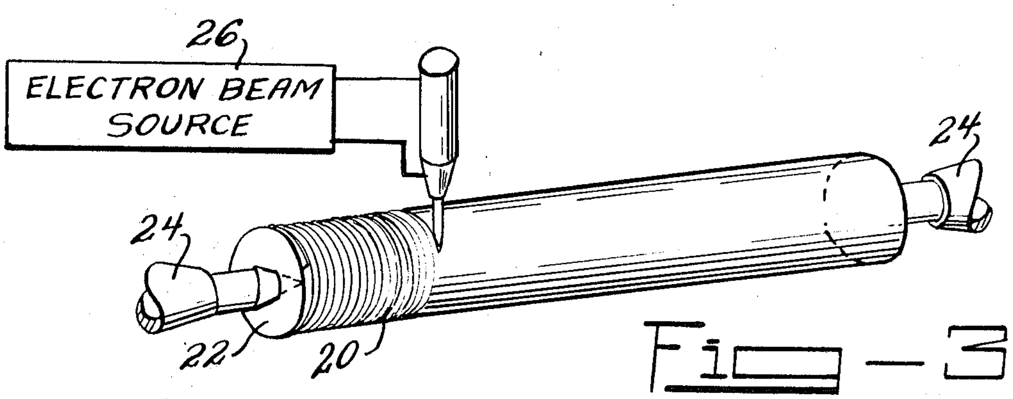
FIG. 3 is a drawing of an alternate superconductor constructed according to the present invention.

It will be appreciated that the present invention may be practiced by construction other than sintered material. For example, in FIG. 3, a superconductor 20 is shown formed on a substrate 22. In the embodiment of FIG. 3, a hard Type II superconductor material, such as niobium-tin, is deposited by conventional vapor or plasma deposition on a sintered alumina substrate 22 in a continuous coat. The substrate, together with the niobium-tin coat, is then rotated by a suitable driving mechanism 24 and the beam from an electron beam source or a laser beam 26 is focused on the niobium-tin coating and effectively cuts the material as the beam source moves along the length of the rotating substrate 22 to form a spiral superconductor 20. For the practice of the present invention, it will be appreciated that both the thickness of deposition of the superconducting material on the substrate 22 and the width of the superconductor 20 formed by the electron or laser beam are sized to provide a cross sectional area less than 1000 times the coherence length of the material forming the superconductor. With this superconductor 20 immersed in superfluid helium, movement of the superfluid helium may be effected through the substrate 22 which, as described, is a sinter, and cooling of the superconductor is effective to inhibit normal region propagation therein.

Figure 4:
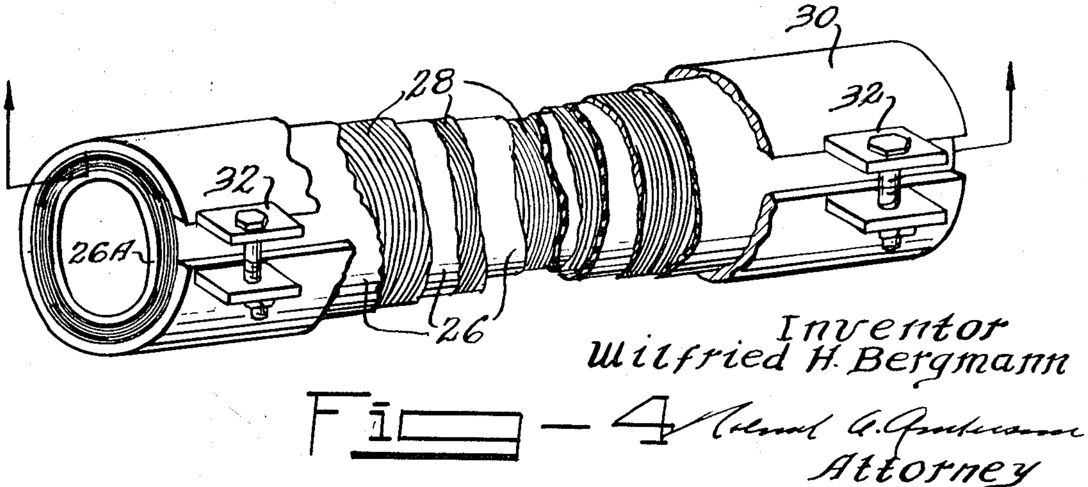
FIG. 4 is a drawing of a magnet constructed using a superconductor constructed according to the present invention.

The structure of the embodiment of FIG. 3 may be further applied to create a superconducting magnet, as shown in the embodiment of FIG. 4. The magnet of FIG. 4 comprises a plurality of sintered substrates 26 of insulating material, such as silica. On each of these substrates deposition of the superconducting material of the hard Type II series and cutting thereof with an electron beam or laser beam is effected as described for the embodiment of FIG. 3 to create a superconductor 28 between each pair of substrate layers. It will be appreciated that construction of the magnet starts with the center substrate 26A and progresses with alternate layered deposition of superconductor and substrate until the desired number of superconductor layers have been achieved. Interconnection of the superconductors in the alternate layers is effected at the ends of the magnet. It will be further appreciated that a magnet as so constructed when placed in operation will be subject to radially expansive forces and axially contractive forces. To withstand these forces, the inner substrate 26A is made thicker in section than the succeeding substrates which effectively act as insulators between the layers of superconductors and as passages for the flow of superfluid helium between the superconductors. To constrain the radially expansive forces of the magnet, a longitudinally-slotted open-end metal cylinder 30 is disposed about the magnet with suitable clamping members 32 attached thereto, so that the internal diameter of the metal cylinder 30 may be adjusted in accordance with the thermal expansion and contraction of the magnet.

Using the aforedescribed embodiment, a 2-inch internal diameter superconducting magnet having an axial length of 6 inches and cooled by superfluid helium may be construced as follows. The inner substrate 26A has a thickness of ½ inch. On top of this are deposited 300 layers of superconducting material of the hard Type II series, such as niobium-tin, with the appropriate sintered substrate layers therebetween. The niobium-tin superconductors are machined such that their cross sectional area is approximately 2 square microns and the separation between the superconductors about the substrate is approximately 2 microns. The thickness of the substrate layers between the superconductors is approximately 2 microns. The outer cylinder 30 is a longitudinally-slotted stainless-steel cylinder having a thickness of ¼ inch. With this structure, a magnet is effected which is capable of achieving a 70-kilogauss magnetic field in a time of less than 5 seconds.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above but should be determined only in accordance with the appended claims.

The embodiments of the invention in which an exclusive property or privilege is claimed are defined as follows:

1. A microstabilized superconductor comprising a sinter including niobium-tin particles having a maximum diameter of one micron to effect microstabilization of the superconductor.

2. The superconductor according to claim 1 further including cooling means comprising superfluid helium passing through the pores of said sinter.

3. A microstabilized superconductor comprising a niobium-tin material having a maximum cross sectional area of two square microns to effect microstabilization of the superconductor.

4. A microstabilized coil comprising a plurality of porous electrically-insulated substrate layers, a plurality of windings of superconductors, each winding disposed about an associated substrate to effect an alternate layer structure, said superconductors being of niobium-tin material and each having a maximum cross sectional area of two square microns, means for electrically interconnecting each of said windings to form said coil, and means for cooling said coil to superconducting temperatures.

5. The apparatus according to claim 4 wherein said cooling means comprise superfluid helium disposed about said substrate layers and windings.

References Cited

UNITED STATES PATENTS

| | | | |
|---|---|---|---|
| 3,205,413 | 9/1965 | Anderson | 174—5C(UX) |
| 3,331,041 | 7/1967 | Bogner | 335—216 |
| 3,277,564 | 10/1966 | Webber et al. | 29—599X |
| 3,301,643 | 1/1967 | Cannon et al. | 29—599(UX) |
| 3,317,286 | 5/1967 | Sorbo | 174—8C(UX) |
| 3,440,585 | 4/1969 | Freeman | 335—216 |
| 3,449,092 | 6/1969 | Hammond | 29—599X |

GEORGE HARRIS, Primary Examiner

U.S. Cl. X.R.

335—299; 29—599